April 25, 1961  A. K. ANDERSEN ET AL  2,981,108
THERMOMETER ASSEMBLY FOR NURSING BOTTLES
Filed Oct. 24, 1957
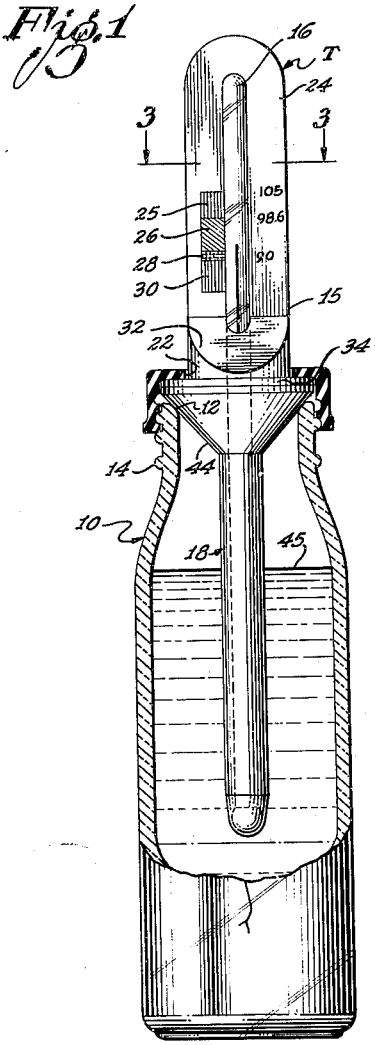
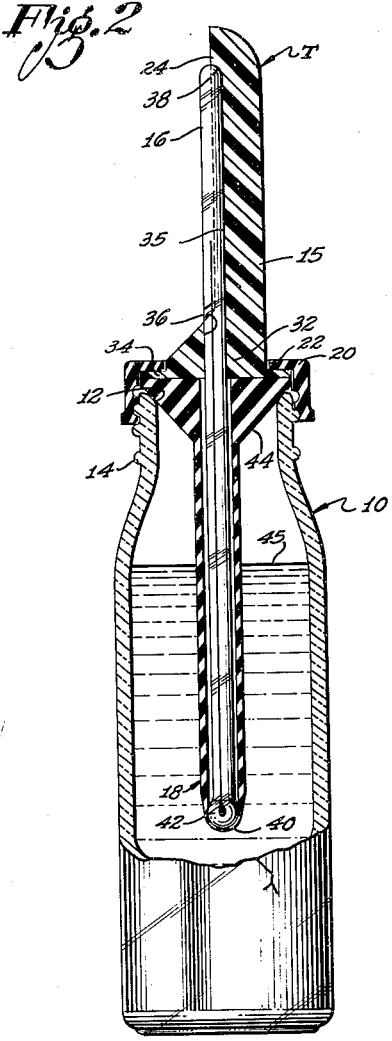
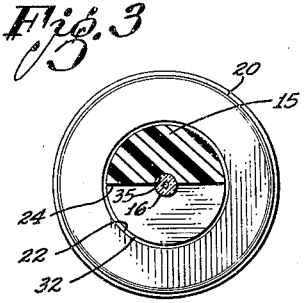
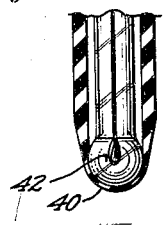
INVENTORS:
Arnold K. Andersen
Charles A. Rife
Attorneys

United States Patent Office 2,981,108
Patented Apr. 25, 1961

2,981,108

THERMOMETER ASSEMBLY FOR NURSING BOTTLES

Arnold K. Andersen, 16518 Tulsa St., Granada Hills, Calif., and Charles A. Rife, 4310 Eve Road, Santa Susana, Calif.

Filed Oct. 24, 1957, Ser. No. 692,088

9 Claims. (Cl. 73—343)

This invention relates to the thermometer for guidance in heating liquids for feeding infants.

One problem in heating milk to a desirable temperature for baby feeding is to provide an accurate thermometer for this purpose that may be read with ease. A second problem is to carry out the heating and temperature-detecting procedure in a hygienic manner. In practice, these two problems are interrelated, since an easy reading thermometer that is of reasonable length cannot withstand the boiling operations that are used for home sterilization of baby feeding equipment.

The invention meets these two problems by providing a sheath to encase the lower part of an easy reading thermometer, the sheath being capable of withstanding boiling temperature; and by further adapting the sheath for sealing cooperation with a nursing bottle to keep the milk in the bottle from contacting the thermometer. This arrangement makes it possible to seal milk in a nursing bottle in a sanitary manner nad then to immerse the bottle in hot water for heating the milk with the guidance of the thermometer.

A feature of the preferred practice of the invention is that the sheath and the thermometer are both adapted for cooperation with a nursing bottle of the type that has a centrally apertured screw cap for mounting a flanged nipple member on the bottle. For this purpose, the thermometer sheath is provided with a circumferential enlargement for sealing contact with the rim of the nursing bottle under the screw cap so that the screw cap may provide the necessary sealing pressure. In addition, the body of the thermometer is adapted for engagement by the screw cap so that the screw cap may also releasably secure the therometer in the sheath.

A further important feature of the preferred practice of the invention is the provision of color zones on the body of the thermometer to indicate at a glance different temperature ranges. As will be explained, one of these color zones is dimensioned in accord with the lag in the thermometer reading with respect to the rising temperature of the milk while the milk is being heated.

The various features and advantages of the invention may be understood from the following detailed description considered with the accompanying drawing.

In the drawing, which is to be regarded as merely illustrative:

Figure 1 is a view partly in side elevation and partly in section showing the construction of the presently preferred embodiment of the invention;

Figure 2 is a view similar to Figure 1 taken at 90° therefrom;

Figure 3 is a transverse section of the thermometer taken as indicated by the line 3—3 of Figure 1; and Figure 4 is an enlarged portion of Figure 2 showing the lower end of the sheath with the thermometer bulb therein.

The principal parts of the assembly shown in Figures 1 and 2 are: a nursing bottle 10 having a rounded rim 12 and an external screw thread 14; a thermometer, generally designated by the letter T, having a body 15 and a glass tube 16 containing a suitable temperature-responsive liquid such as mercury or alcohol; a removable sheath 18 enclosing the lower portion of the glass tube 16; and a screw cap 20 with a central circular opening 22, which cap is internally screw-threaded and is normally employed to mount a flanged nipple member (not shown) on the bottle 10.

The thermometer body 15, which may be made of suitable thermosetting plastic material, is of semi-cylindrical configuration throughout the major portion of its length and has a diametrical face 24 to carry suitable indicia. As can be seen in Figure 1, the temperature numerals are provided on the one side of the face 24 on the one side of the glass tube 16 and on the other side of the glass tube are four color zones comprising: an upper red zone 25, an adjacent green zone 26, a relatively narrow yellow zone 28, and, finally, a lower red zone 30. Preferably, but not necessarily, the glass tube 16 contains a column of mercury.

The thermometer body 15 has a cylindrical lower end portion 32 which is formed with a radial end flange 34 for engagement by the screw cap 20. The bottom face of the thermometer body 15 at the flange 34 is in a plane normal to the longitudinal axis of the body for abutment against the upper end of the sheath 18.

The glass tube 16 seats in a longitudinal groove 35 in the face 24 of the thermometer body 15 and extends through a corresponding axial bore 36 in the lower cylindrical body portion 32. The upper end of the glass tube 16 abuts the upper end wall 38 of the longitudinal groove 35. The glass tube may be suitably bonded to the thermometer body 15 in a suitable manner.

The sheath 18 is of tubular configuration throughout the major portion of its length and is closed at its bottom end by an end wall 40. While the sheath 18 may be made of various materials in various practices of the invention, in this instance the sheath is made of molded latex and is heat-treated to approximately 250° F. to resist boiling temperatures. The end wall 40 of the sheath that contacts the bulb 42 of the thermometer tube 16 is relatively thin, the thickness being preferably on the order of .004 inch. The diameter of the bulb 42 is slightly less than the inside diameter of the sheath 18 to prevent the trapping of air in the sheath when the thermometer is inserted therein.

The sheath 18 is suitably adapted for sealing contact with the rim 12 of the bottle 10 and for this purpose may have an integral conical enlargement 44 at its upper end to make line contact with the rounded bottle rim. The end face of the sheath 18 at the upper end of the conical enlargement 44 is in a plane normal to the longitudinal axis of the sheath for cooperating abutment with the lower end of the thermometer body 15.

The manner in which the invention serves its purpose may be readily understood from the foregoing description. It is apparent that the sheath 18, separate and apart from the thermometer T, may be boiled with the bottle 10, the cap 20 and the usual nursing nipple for sterilization in the usual manner.

A quantity of milk 45 is placed in the bottle and then the parts are assembled as shown in Figures 1 and 2 with the screw cap 20 pressing the thermometer flange 34 against the conical sheath enlargement 44 and additionally pressing the sheath enlargement into sealing contact with the bottle rim 12. Preferably, the thermometer T is so dimensioned relative to the sheath 18 that when the thermometer flange 34 is pressed against the sheath enlargement 44 by the screw cap 20, the thermometer bulb 42 pushes down to stretch the sheath slightly, thereby to insure intimate heat-transfer contact of the sheath with the thermometer bulb.

The sealed assembly is then subjected to heat by immersing at least the lower portion of the bottle 10 in hot water. When the rising mercury column of the thermometer reaches the lower end of the green zone 26, the assembly is removed from the hot water and is shaken for thorough agitation of the milk. The milk then normalizes at a temperature of approximately 98.6° F. at the upper end of the green zone 26. If the mercury column reaches the upper red zone 25 the milk is too hot for feeding. On the other hand, if the mercury column drops to the lower red zone 30, the milk is too cold for feeding. The intermediate yellow zone 28 represents a relatively cool temperature range that is satisfactory for mature babies but not for young babies. The temperature zone 26 is the normal temperature range for baby feeding.

The lower end of the longitudinal dimension of the green zone 26 is set according to the lag in the rise of the temperature reading of the thermometer relative to the rise in the temperature of the milk in the heating process. This lag is attributable for the most part to the insulating effect of the sheath 18, since an interval of time is required for heat transfer through the material of the sheath. To a minor extent, the lag may also be attributable to the fact that the milk does not heat uniformly when the bottle is immersed in hot water without agitation. In any event, the milk is heated to a desirable temperature if a conventional heating procedure is followed and the heating operation is terminated when the mercury column reaches the lower end of the green zone 26.

When the mercury indicates that the milk is at a satisfactory temperature, it is a simple matter to remove the thermometer and the sheath from the cap and to substitute the usual sterilized nipple member in the usual manner.

Our description in specific detail of the presently preferred practice of the invention will suggest various changes, substitutions and other departures from our disclosure that properly lie within the spirit and scope of the appended claims.

We claim:

1. A thermometer assembly or use with a nursing bottle to ascertain the temperature of liquid confined therein, comprising: a thermometer; and an impervious sheath of flexible resilient rubber-like material removably mountable on the thermometer in position completely encasing the lower end of the thermometer, said sheath having a closed lower end and having an enlarged upper portion shaped and dimensioned at its outer end for resilient sealing fit with the mouth of the nursing bottle, whereby said sheath may be sterilized by heat separately from the thermometer and then applied to the thermometer for heat transfer from the confined liquid in the bottle to the thermometer through the wall of the sheath with the confined liquid sealed off from the thermometer.

2. A thermometer assembly as set forth in claim 1 in which the lower end of said sheath is reduced in thickness and is dimensioned to fit snugly around the lower end of the thermometer, whereby the thinness of the sheath and the snugness of fit facilitates heat transfer from the confined liquid to the thermometer.

3. A thermometer assembly as set forth in claim 1 which includes index means on said thermometer for use when the thermometer follows the rise in temperature of the confined liquid during an operation of heating the liquid in the bottle, said index means including a first index indicating the desired temperature of the liquid and a second index for indicating a lower temperature in accord with the lag in rise of the thermometer reading during the heating operation whereby termination of the heating operation when the thermometer reading reaches said second index results in the heating of the confined liquid to substantially said desired temperature.

4. A thermometer assembly for use with a nursing bottle to ascertain the temperature of a liquid confined therein, said bottle being equipped with a removable cap to press the peripheral portion of a nipple member into sealing contact with the rim of the bottle mouth, said assembly including: a thermometer; and a sheath removably mountable on the thermometer in position completely encasing the lower end of the thermometer, said sheath having a closed lower end and having an enlargement of resilient rubber-like material spaced from said lower end for sealing pressure against the bottle mouth by said removable cap whereby said sheath may be sterilized by heat apart from the thermometer and then applied to the thermometer for heat transfer from the confined liquid to the thermometer through the wall of the sheath with the confined liquid sealed off from the thermometer.

5. A thermometer assembly as set forth in claim 4 in which said enlargement is of upwardly divergent conical configuration for line contact with the inner surface of the rim of the bottle mouth.

6. A thermometer assembly for use with a nursing bottle to ascertain the temperature of a liquid confined therein, said bottle being equipped with a removable centrally apertured cap to press the peripheral portion of a nipple member into sealing contact with the rim of the bottle mouth, said assembly including: a thermometer comprising a tube and a body mounted thereon, said body being shaped and dimensioned to extend through said cap and having a circumferential flange for engagement with the inner surface of said cap; and an impervious sheath removably mountable on the thermometer tube in position completely encasing the lower end of the tube, said sheath having a closed lower end and having an enlargement of resilient rubber-like material spaced from said lower end and shaped to extend between said flange and the rim of the bottle whereby tightening said cap against said flange both anchors said tube in said sheath and exerts pressure against said enlargement of the sheath to seal off the interior of the bottle from the thermometer.

7. A thermometer assembly as set forth in claim 6 in which said sheath and its enlargement comprise a unitary body of rubber-like material.

8. A thermometer assembly for use with a nursing bottle to ascertain the temperature of a liquid confined therein, said bottle being equipped with a removable centrally apertured cap to press the peripheral portion of a nipple member into sealing contact with the rim of the bottle mouth, said assembly including: a tubular thermometer; a body partially enclosing the upper portion of the thermometer to protect its upper portion and to serve as a handle for the thermometer, the upper portion of the thermometer being exposed along at least a portion of said body, said body having a circumferential flange below the exposed portion of the thermometer; a sheath of rubber-like material removably mountable on the lower portion of the thermometer in position completely encasing the lower end of the thermometer, said sheath having an upper enlargement of rubber-like material to extend between said flange and the rim of the bottle whereby said cap may be mounted on the rim of the bottle against said flange to clamp said enlargement of the sheath against the rim of the bottle to seal off the interior of the bottle from the thermometer.

9. A combination as set forth in claim 8 in which said body is provided with index means adjacent the exposed portion of the thermometer, said index means including a first index indicating the desired temperature of the liquid and a second index for indicating a lower temperature in accord with the lag in rise of the thermometer reading during the heating operation whereby termination of the heating operation when the thermometer reading reaches said second index results in the heating of the confined liquid to substantially said desired temperature.

References Cited in the file of this patent

UNITED STATES PATENTS

| | | |
|---|---|---|
| 738,960 | Vaughan | Sept. 15, 1903 |
| 1,530,382 | Ligotz | Mar. 17, 1925 |
| 1,973,838 | Zubaty | Sept. 18, 1934 |
| 2,243,356 | Olson | May 27, 1941 |
| 2,430,290 | Hann | Nov. 4, 1947 |
| 2,523,691 | Fitch | Sept. 26, 1950 |
| 2,666,328 | Bick | June 19, 1954 |
| 2,814,202 | Frans | Nov. 26, 1957 |